US008886966B2

(12) United States Patent
Aoyagi et al.

(10) Patent No.: US 8,886,966 B2
(45) Date of Patent: Nov. 11, 2014

(54) INFORMATION PROCESSING APPARATUS AND OPERATION CONTROL METHOD

(75) Inventors: Tatsuya Aoyagi, Tachikawa (JP); Tatsuya Kawawa, Nishitama-gun (JP)

(73) Assignee: Kabushiki Kaisha Toshiba, Tokyo (JP)

(*) Notice: Subject to any disclaimer, the term of this patent is extended or adjusted under 35 U.S.C. 154(b) by 1352 days.

(21) Appl. No.: 11/543,526

(22) Filed: Oct. 5, 2006

(65) Prior Publication Data
US 2007/0083780 A1    Apr. 12, 2007

(30) Foreign Application Priority Data

Oct. 7, 2005    (JP) .................................. 2005-294603

(51) Int. Cl.
*G06F 1/32*    (2006.01)
(52) U.S. Cl.
CPC ............ *G06F 1/3203* (2013.01); *G06F 1/3246* (2013.01)
USPC .......................................................... 713/300
(58) Field of Classification Search
USPC .......................................................... 713/300
See application file for complete search history.

(56) References Cited

U.S. PATENT DOCUMENTS

| 6,065,123 | A  | * | 5/2000 | Chou et al. ..................... 713/322 |
| 6,076,171 | A  |   | 6/2000 | Kawata |
| 6,937,370 | B1 | * | 8/2005 | Nitta et al. ..................... 358/518 |
| 6,965,763 | B2 |   | 11/2005 | Bussan et al. |
| 7,028,195 | B2 | * | 4/2006 | Kasprzak et al. ............. 713/300 |
| 7,203,854 | B2 | * | 4/2007 | Luke et al. ..................... 713/320 |
| 7,218,911 | B2 | * | 5/2007 | Shohara et al. ............ 455/343.1 |
| 7,373,537 | B2 |   | 5/2008 | Rothman et al. |
| 7,406,611 | B2 | * | 7/2008 | Takahashi et al. ............ 713/300 |
| 2003/0214657 | A1 | * | 11/2003 | Stringham ..................... 358/1.1 |

FOREIGN PATENT DOCUMENTS

| JP | 08-055073 | 2/1996 |
| JP | 9-282054 | 10/1997 |
| JP | H10-063362 A | 3/1998 |
| JP | 2000-148615 | 5/2000 |
| JP | 2000-322183 A | 11/2000 |
| JP | 2001-014050 A | 1/2001 |
| JP | 2001-273055 | 10/2001 |
| JP | 2002-073340 A | 3/2002 |

(Continued)

OTHER PUBLICATIONS

English Translation of Japanese Office Action dated Apr. 1, 2008.

(Continued)

*Primary Examiner* — Paul Yanchus, III
*Assistant Examiner* — Eric Chang
(74) *Attorney, Agent, or Firm* — Knobbe Martens Olson & Bear, LLP

(57) ABSTRACT

According to one embodiment, an information processing apparatus which includes a function of executing a predetermined task upon resuming from a power saving state at a predetermined timing, and changing to the power saving state after the task is completed, comprises an determination unit configured to determine whether the information processing apparatus satisfies a predetermined condition every predetermined timing of executing the predetermined task in the power saving state of the information processing apparatus, and a control unit configured to control to execute the predetermined task upon resuming the information processing apparatus from the power saving condition when the determination unit determines that the information processing apparatus satisfies the predetermined condition, and maintain the information processing apparatus in the power saving mode when the determination unit determines that the information processing apparatus does not satisfy the predetermined condition.

9 Claims, 8 Drawing Sheets

(56) References Cited

FOREIGN PATENT DOCUMENTS

| JP | 2002-215340 A | 8/2002 |
|---|---|---|
| JP | 2002-341975 | 11/2002 |
| JP | 2004-126749 A | 4/2004 |
| JP | 2004-139613 A | 5/2004 |
| JP | 2005-004544 | 1/2005 |

OTHER PUBLICATIONS

An English Translation of Notification of Reasons for Rejection mailed by the Japanese Patent Office for Counterpart Japanese Patent Application No. 2005-294602 on Apr. 1, 2008.

Office Action issued Apr. 6, 2009 in U.S. Appl. No. 11/543,669, filed Oct. 5, 2006.

Office Action Response filed Jul. 6, 2009 in U.S. Appl. No. 11/543,669, filed Oct. 5, 2006.

An English Translation of Notification of Reasons for Rejection mailed by the Japanese Patent Office for Counterpart Japanese Patent Application No. 2005-294603 on Apr. 1, 2008.

Final Office Action issued Oct. 29, 2009 in U.S. Appl. No. 11/543,669, filed Oct. 5, 2006.

RCE and Amendment filed Jan. 29, 2009 in U.S. Appl. No. 11/543,669, filed Oct. 5, 2006.

\* cited by examiner

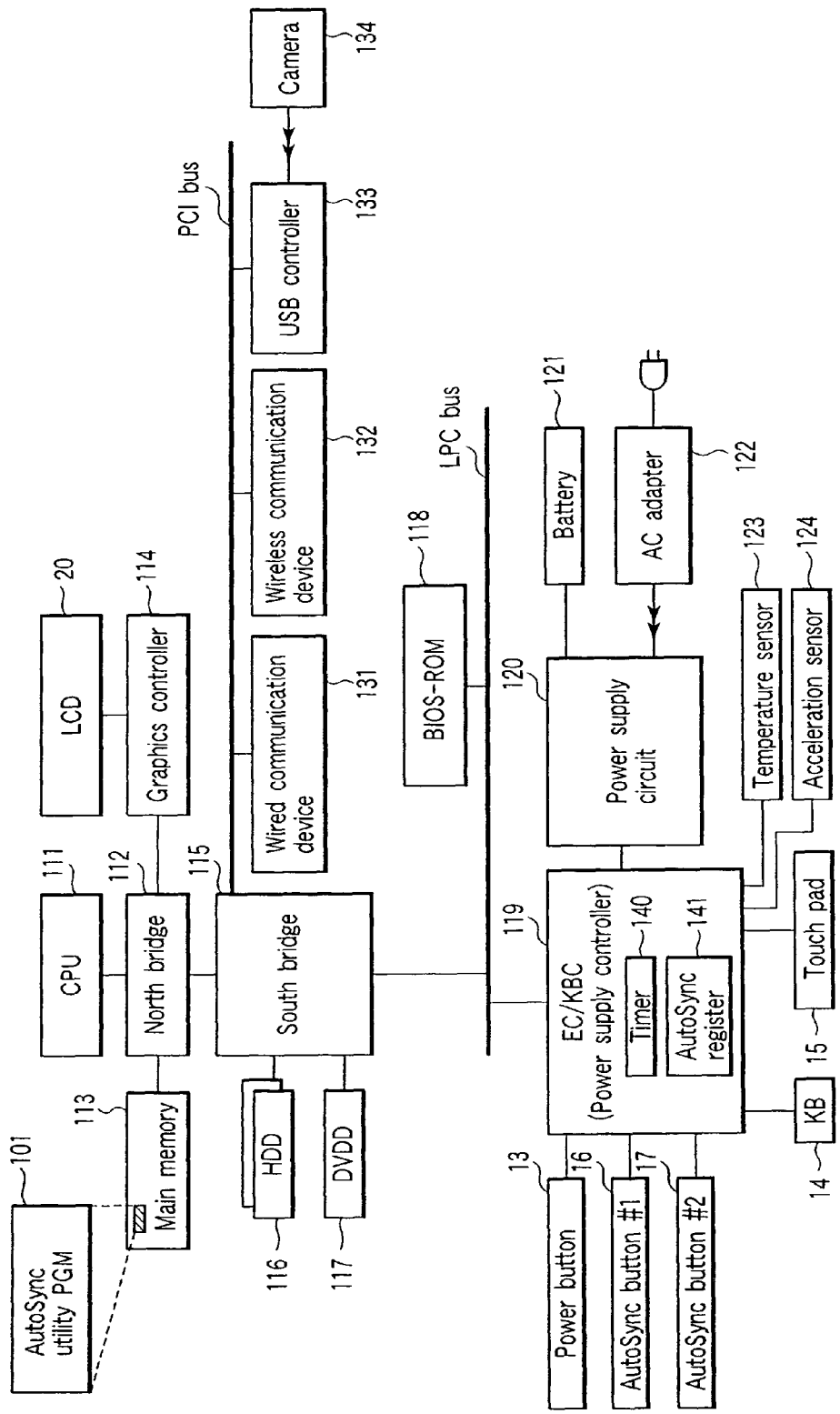
F I G. 3

| Task name | Task execution | Task execution interval | Condition to inhibit task | |
|---|---|---|---|---|
| | | | Remaining battery capacity | Free space of HDD |
| Mail transmission/reception | On | 30 min | 5 % or less | 10 MB |
| Folder synchronization | On | 20 min | 10 % or less | 100 MB |
| Web browse | Off | 80 min | 20 % or less | 50 MB |
| Camera image sensing | Off | 5 min | 5 % or less | 50 MB |

FIG. 7

| Task name | DVDD | USB controller | LCD | CPU speed |
|---|---|---|---|---|
| Mail transmission/reception | OFF | OFF | OFF | Low |
| Folder synchronization | OFF | OFF | OFF | Low |
| Web browse | OFF | OFF | OFF | Low |
| Camera image sensing | OFF | ON | OFF | Low |
| Normal activation | ON | ON | ON | High |

FIG. 8

INFORMATION PROCESSING APPARATUS AND OPERATION CONTROL METHOD

CROSS-REFERENCE TO RELATED APPLICATIONS

This application is based upon and claims the benefit of priority from Japanese Patent Application No. 2005-294603, filed Oct. 7, 2005, the entire contents of which are incorporated herein by reference.

BACKGROUND

1. Field

One embodiment of the invention relates to an operation control technique to be applied to an information processing apparatus such as a personal computer.

2. Description of the Related Art

In recent years, a battery drivable and portable information processing apparatus such as a notebook personal computer has been very popular. Many of information processing apparatuses of this type have a wireless communication function capable of checking mail and downloading data even while a user is outing or on the move.

This type of information processing apparatus generally has a so called suspend/resume function capable of resuming the job from the suspend state at the closing time on the previous day. Various schemes for performing resume processing at a predetermined timing have been proposed (for example, see Jpn. Pat. Appln. KOKAI Publication No. 2002 341975). Upon performing resume processing at a predetermined timing, a personal computer can be activated as needed while reducing power consumption.

Assume that a wireless communication function allows to check mail and download data every predetermined timing. In this case, the information processing apparatus needs to satisfy conditions that, e.g., "the information processing apparatus can communicate with a base station", "the remaining battery capacity is a predetermined value or more", and "the free space of a storage device is a predetermined value or more". If the information processing apparatus does not satisfy these conditions, resume processing at this timing must be prevented even at the predetermined timing.

The condition of the information processing apparatus changes depending on a task to be executed at each timing. Hence, the conditions corresponding to the respective tasks must be compared with each other to determine whether to perform resume processing.

However, conventionally, resume processing is unconditionally performed at a predetermined timing without controlling to individually determine whether to perform resume processing for each task.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 3 is an exemplary block diagram showing the hardware arrangement of the information processing apparatus according to the embodiment;

FIG. 7 is an exemplary task condition table stored in the AutoSync register of an EC/KBC in the information processing apparatus according to the embodiment;

FIG. 8 is an exemplary hardware setting table stored in the AutoSync register of the EC/KBC in the information processing apparatus according to the embodiment;

DETAILED DESCRIPTION

Various embodiments according to the invention will be described hereinafter with reference to the accompanying drawings. In general, according to one embodiment of the invention, an information processing apparatus which includes a function of executing a predetermined task upon resuming from a power saving state at a predetermined timing, and changing to the power saving state after the task is completed, comprises an determination unit configured to determine whether the information processing apparatus satisfies a predetermined condition every predetermined timing of executing the predetermined task in the power saving state of the information processing apparatus; and a control unit configured to control to execute the predetermined task upon resuming the information processing apparatus from the power saving condition when the determination unit determines that the information processing apparatus satisfies the predetermined condition, and maintain the information processing apparatus in the power saving mode when the determination unit determines that the information processing apparatus does not satisfy the predetermined condition.

Figure 1:
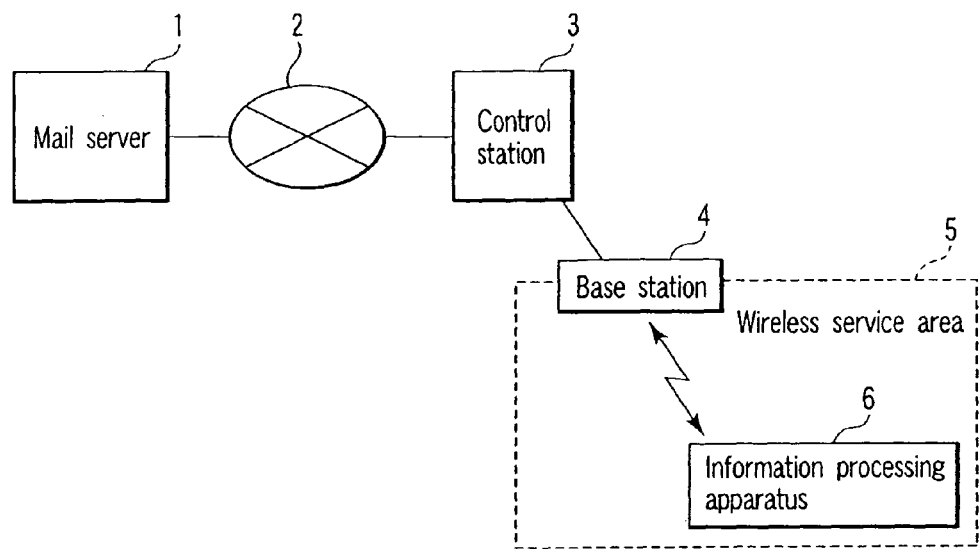
FIG. 1 is an exemplary view showing a use example of an information processing apparatus according to an embodiment of the present invention.

FIG. 1 shows an exemplary use example of an information processing apparatus according to an embodiment of the present invention. In this embodiment, an information processing apparatus 6 serves as, e.g., a battery drivable notebook personal computer having a wireless communication function. When the information processing apparatus 6 is in a wireless service area 5 of one of base stations 4, it can communicate with the base station 4.

A control station 3 accommodates each base station 4 to execute relay between each base station 4 and a public line network 2. A mail server 1 is connected to the public line network 2. That is, when the information processing apparatus 6 is in the wireless service area of the base station 4, a user can check and receive new mail upon accessing the mail server 1 even if the user is outing or on the move. Additionally, the user can download data not only from the mail server 1 but also from another server, and can browse a Web page.

The information processing apparatus 6 also has a function of resuming from a power saving mode every predetermined timing, automatically checking new mail and downloading data, and returning to the power saving mode after the mail check and download are completed. This function will be referred to as an AutoSync function hereinafter. This AutoSync function allows to automatically perform data communication with the base station 4. Note that this AutoSync function is merely an example. The present invention is not limited to data communication such as the new mail check to be automatically executed upon resuming from the power saving mode. Any processes can be applied to the present invention.

Note that the information processing apparatus 6 cannot check new mail outside the wireless service area 5 of the base station 4. In this state, the information processing apparatus 6 must not resume from the power saving mode in order to check new mail. Hence, the information processing apparatus 6 has a function of appropriately determining whether the resume from the power saving mode is necessary. This will be explained in detail below.

Figure 2:
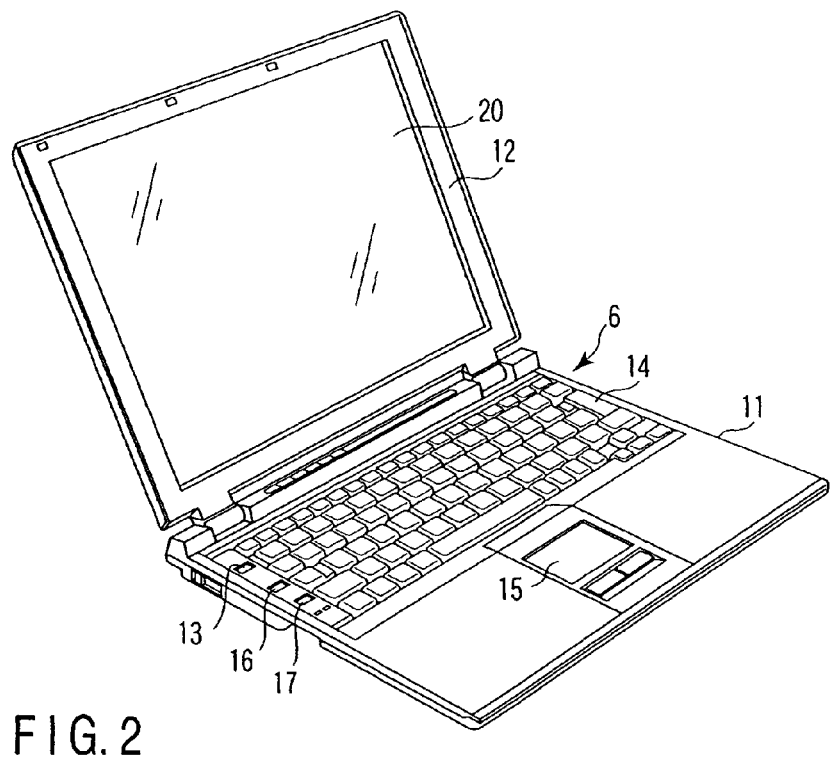
FIG. 2 is an exemplary perspective view showing the outer appearance of the information processing apparatus whose display unit is open according to the embodiment.

FIG. 2 is an exemplary perspective view when viewed from the front side of the information processing apparatus (computer) 6 whose display unit is open.

The computer 6 comprises a computer body 11 and display unit 12. The display unit 12 incorporates a display device formed from an LCD (Liquid Crystal Display) 20, and the display screen of the LCD 20 is located at almost the center of the display unit 12.

The display unit 12 is supported by and attached to the computer body 11 so that it freely pivots between an open position where the upper surface of the computer body 11 is exposed and a closed position where this upper surface is covered. The computer body 11 has a low profile box like housing, and its upper surface is equipped with a power button 13 for turning on/off the computer 6, a keyboard 14, and a touch pad 15.

Two AutoSync buttons 16 and 17 are juxtaposed with the power button 13 on the upper surface of the computer body 11. The AutoSync buttons 16 and 17 are used to instruct to check new mail and download data with the AutoSync function as required. New mail is checked upon pressing the AutoSync button 16, and data is downloaded upon pressing the AutoSync button 17.

FIG. 3 shows an example of the hardware arrangement of the computer 6.

As shown in FIG. 3, the computer 6 incorporates a CPU 111, north bridge 112, main memory 113, graphics controller 114, south bridge 119, hard disk drive (HDD) 116, digital versatile disk drive (DVDD) 117, BIOS (Basic Input Output system) ROM 118, embedded controller/keyboard controller IC (EC/KBC) 119, power supply circuit 120, wired communication device 131, wireless communication device 132, USB (Universal Serial Bus) controller 133, and the like.

The CPU 111 is a main processor adopted to control the operation of the computer 6. The CPU 111 executes an operating system and various application programs/utility programs that are loaded from the HDD 116 to the main memory 113. An AutoSync utility program 101 (to be described later) serves as one of the utility programs. The CPU 111 also executes a BIOS (Basic Input Output System) stored in the BIOS ROM 118. The BIOS is a program for controlling hardware.

The north bridge 112 is a bridge device which connects the local bus of the CPU 111 and the south bridge 115. The north bridge 112 also has a function of executing communication with the graphics controller 114 via an AGP (Accelerated Graphics Port) bus or the like. The north bridge 112 also incorporates a memory controller which controls the main memory 113.

The graphics controller 114 is a display controller which controls the LCD 20 used as the display monitor of the computer 6. The south bridge 115 is connected to each of a PCI (Peripheral Component Interconnect) bus and an LPC (Low Pin Count) bus. The south bridge 115 incorporates an IDE controller for controlling the HDD 116 and DVDD 117.

The embedded controller/keyboard controller IC (EC/KBC) 119 is a 1 chip microcomputer obtained by integrating an embedded controller for managing power supply and a keyboard controller for controlling the keyboard (KB) 14 and touch pad 15. The EC/KBC 119 has a function of powering on/off the computer 6 in accordance with user operation to the power button 14 in collaboration with the power supply circuit 120.

The EC/KBC 119 controls to resume the computer 6 from the power saving mode with the AutoSync function. Hence, the EC/KBC 119 has a timer 140 for measuring date/time, and an AutoSync register 141 for holding various pieces of setting information for the AutoSync function. The EC/KBC 119 also detects the ON/OFF operations of the AutoSync buttons 16 and 17.

That is, the EC/KBC 119 monitors two trigger timings, i.e., "a timing of measuring a predetermined date/time with the timer 140" and "a timing of pressing the AutoSync button 16 or 17" for executing the AutoSync function. Upon detecting one of these trigger timings, the EC/KBC 119 determines whether the computer 6 needs to resume from the power saving mode. The EC/KBC 119 also receives detection data from a temperature sensor 123 and acceleration sensor 124 arranged in the housing of the information processing apparatus 6.

The power supply circuit 120 generates an operation power supply to be supplied to each component of the computer 6 from a battery 121 or an external power supply supplied via an AC adapter 122. Even if the computer 6 is powered off, the power supply circuit 120 supplies the operation power supply to the EC/KBC 119.

The wired communication device 131 communicates with an external apparatus via a wired communication route, and the wireless communication device 132 communicates with an external apparatus via a wireless communication route. The USB controller 133 communicates with a peripheral device such as a camera 134 via a serial interface.

Figure 4:
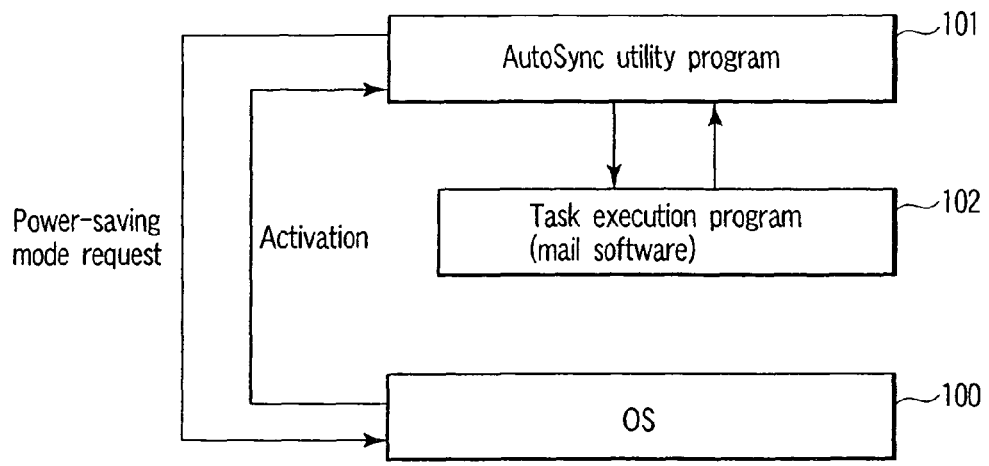
FIG. 4 is an exemplary block diagram showing the software configuration of the information processing apparatus according to the embodiment.

Referring to FIG. 4, the software configuration for implementing the AutoSync function in the computer 6 having this hardware arrangement will be described next.

An operating system (OS) 100 is a basic program which collectively manages the resources of the computer 6. In the power saving mode of the computer 6, when detecting a timing at which the AutoSync function allows to execute a given process (sometimes to be referred to as a task hereinafter) and determining that the computer 6 must resume from the power saving mode in order to execute this process, i.e., when determining that the computer 6 can execute this process, the EC/KBC 119 activates the operating system 100.

After being activated by the EC/KBC 119, the operating system 100 activates the AutoSync utility program 101. The AutoSync utility program 101 then activates a task execution program 102 such as mail software for controlling a process to be executed at this timing.

When processing is completed by the task execution program 102 activated as described above, the task execution program 102 sends a message indicating this to the AutoSync utility program 101, and the process ends. On the other hand, the AutoSync utility program 101 which has received the message then requests the operating system 100 to change the computer 6 to the power saving mode, and the process ends. With these processes, the computer 6 returns to the power saving mode.

Figure 5:
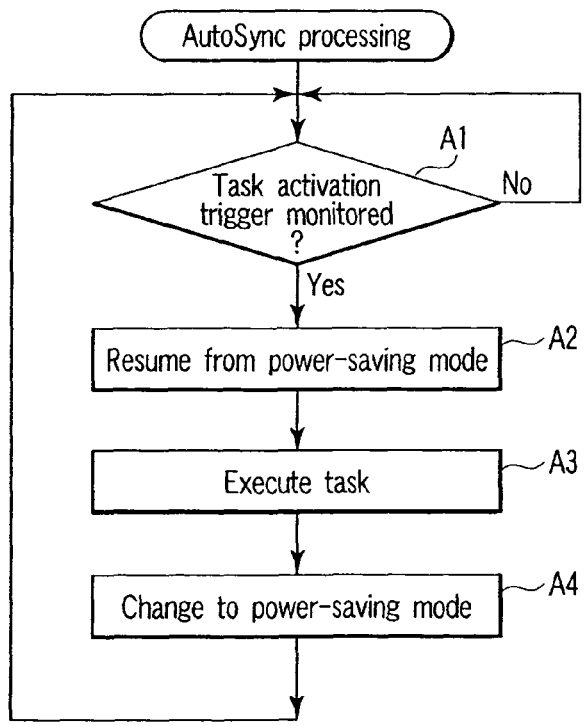
FIG. 5 is an exemplary flowchart showing the basic sequence of AutoSync processing executed by the information processing apparatus according to the embodiment.

FIG. 5 is an exemplary flowchart showing a basic sequence of AutoSync processing in the above described hardware arrangement and software configuration.

At a timing when a given process is to be executed (YES in block A1), the computer 6 resumes from the power saving mode (block A2), and executes the process (block A3). Upon completion of this process, the computer 6 changes to the power saving mode (block A4). Hence, the user recognizes that the new mail check is complete even in the power saving mode before the user is aware of it.

Figure 6:
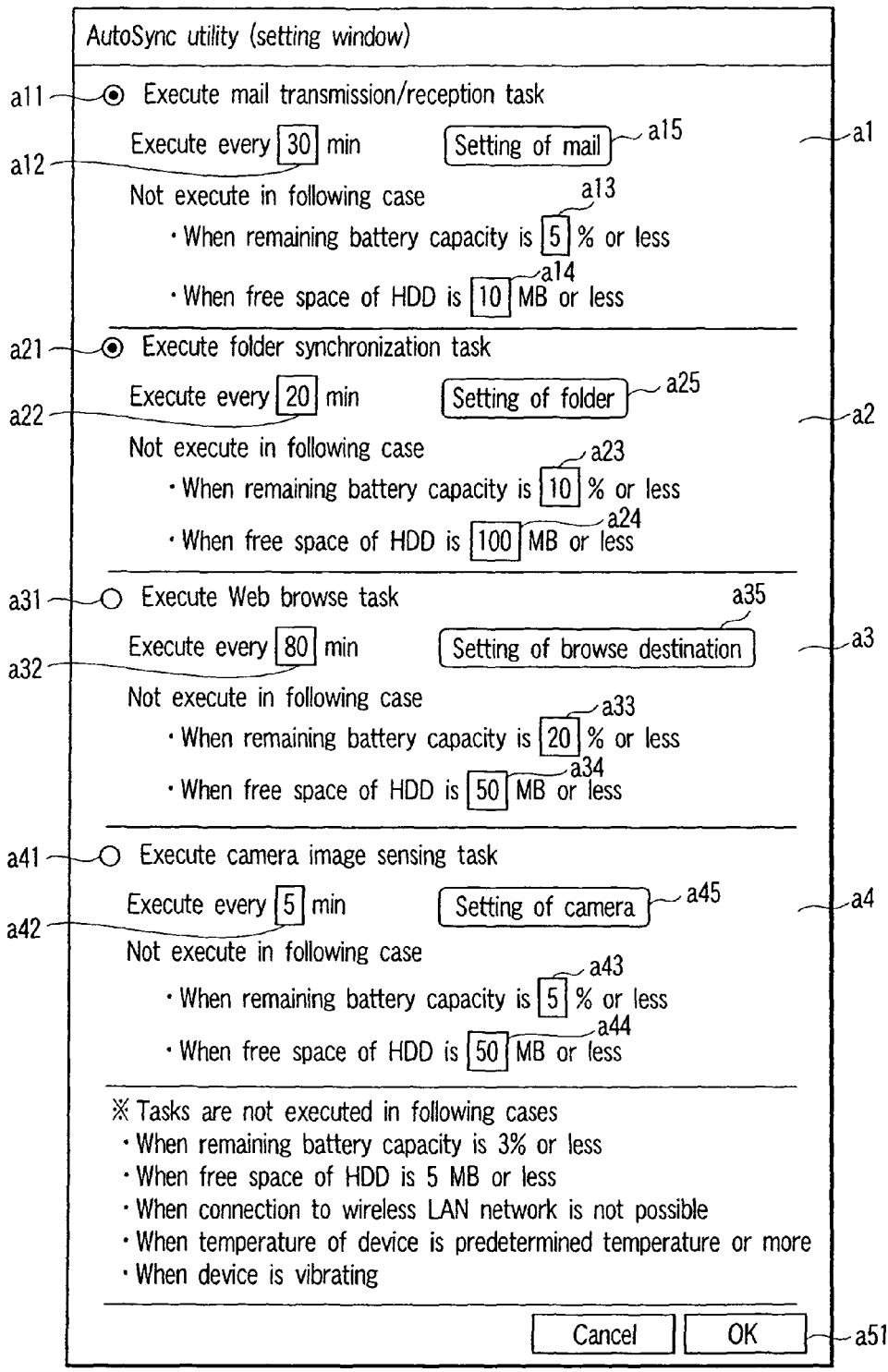
FIG. 6 is an exemplary view showing a setting window displayed as a user interface in accordance with an AutoSync utility program in the information processing apparatus according to the embodiment.

FIG. 6 is an exemplary view showing a setting window displayed as a user interface in accordance with the AutoSync utility program 101.

As shown in FIG. 6, four fields a1 to a4 for individually setting four tasks, i.e., "mail transmission/reception task", "folder synchronization task", "Web browse task", and "camera image sensing task" are provided in the setting window displayed in accordance with the AutoSync utility program 101. The "mail transmission/reception task" is prepared to check (receive) new mail and send unsent mail. The "folder synchronization task" is prepared to download schedule data from a predetermined server and reflect the obtained schedule data to schedule data stored in the computer 6. The "Web browse task" is prepared to download a new or updated Web page with reference to a Web page in a predetermined site. The "camera image sensing task" is prepared to send a control signal to instruct a camera externally connected via the USB controller 133 to sense an image.

The fields a1 to a4 have respective buttons (a11, a21, a31, and a41) for setting whether to automatically execute the respective tasks with the AutoSync function. Upon turning on these buttons, the AutoSync function allows to automatically execute the respective tasks. In this case, since the "mail transmission/reception task" and "folder synchronization task" are turned on, the AutoSync function allows to automatically execute these two tasks. These "mail transmission/reception task" and "folder synchronization task" are also executed as needed, upon depression of the AutoSync buttons 16 and 17 regardless of the ON/OFF operations of the buttons a11 and a21.

The fields a1 to a4 have respective input areas (a12, a22, a32, and a42) for setting interval times for the respective tasks. The "mail transmission/reception task" is executed every 30 min. The "folder synchronization task" is executed every 20 min. The "Web browse task" is executed every 80 min, and the "camera image sensing task" is executed every five min (upon turning on the buttons a31 and a41).

The fields a1 to a4 have respective input areas (a13, a23, a33, and a43) for setting remaining battery capacities to determine whether to execute the tasks, and input areas (a14, a24, a34, and a44) for setting the free space of an HDD. For example, when the remaining battery capacity is 5% or less, or when the free space of the HDD is 10 MB or less in the computer 6, the "mail transmission/reception task" is canceled even at the timing when the computer 6 needs to resume from the power saving mode. The computer 6 is kept in the power saving mode.

The EC/KBC 119 obtains remaining battery capacity information at this time by communicating with the power supply circuit 120. When requesting to change the computer to the power saving mode, the AutoSync utility program 101 obtains the free space information of the HDD from the operating system 100. The AutoSync utility program 101 outputs the obtained value to the EC/KBC 119 to hold it in the AutoSync register 141. With reference to the value held by the AutoSync register 141 when changing to the power saving mode, the EC/KBC 119 obtains the free space information of the HDD at this time.

That is, on this setting window, the state of the computer 6 for executing a task can be set as a condition for each task. When the remaining battery capacity is 3% or less, when the free space of the HDD is 5 MB or less, when the device temperature is a predetermined value or more, or when the device is vibrating, all tasks are cancelled. The above described temperature sensor 123 and acceleration sensor 124 are prepared to cause the EC/KBC 119 to determine whether the device temperature is a predetermined temperature or more, and whether the device is vibrating.

When the computer cannot be connected to a wireless LAN network, all tasks other than the "camera image sensing task" are cancelled. The wireless communication device 132 always monitors the electric field strength of a wireless signal transmitted from the base station, and the EC/KBC 119 receives information indicating permission/inhibition of connecting to a wireless LAN network at this time by communicating with the wireless communication device 132. The power supply circuit 120 always supplies the operation power supply to the wireless communication device 132.

The fields a1 to a4 have respective buttons (a15, a25, a35, and a45) for displaying the setting window to set each task. For example, upon operation of the button a15 in the field a1 for the "mail transmission/reception task", the sequence advances to a setting operation for transmitting and receiving mail via the mail server 1.

A button a51 arranged in the lower portion of this setting window is a button to be operated after the above described setting operation is completed. Upon operation of the button a51, the AutoSync utility program 101 generates a task condition table containing setting contents. The generated task condition table is output to the EC/KBC 119, and held in the AutoSync register 141. The AutoSync utility program 101 then requests the operating system 100 to change the computer 6 to the power saving mode.

FIG. 7 is the exemplary task condition table which is output by the AutoSync utility program 101 and stored in the AutoSync register 141 of the EC/KBC 119. As shown in FIG. 7, the contents set on the setting window are held as the task condition table in the AutoSync register 141. Since the held task condition table is held, the EC/KBC 119 can appropriately determine for each task whether the computer needs to resume from the power saving mode to execute each task.

The AutoSync register 141 of the EC/KBC 119 also holds a hardware setting table which represents how to set the operating environments of various devices set in executing each task (FIG. 8). This hardware setting table can define, for each task, the ON/OFF states of DVDD 117, USB controller 133, and LCD 20, and high/low speed of the CPU 111. Since this hardware setting table is held, the EC/KBC 119 can appropriately suppress, for each task, power consumption for unnecessary devices. For example, in executing the "mail transmission/reception" task, all of the DVDD 117, USB controller 133, and LCD 20 are defined to be off. Hence, the EC/KBC 119 turns off the power supply lines of the DVDD 117, USB controller 133, and LCD 20. The EC/KBC 119 has a function of turning on/off the power supply line which connects the power supply circuit 120 to the DVDD 117, USB controller 133, and LCD 20. Since the speed of the CPU 111 is defined to be low in executing the "mail transmission/reception" task, the EC/KBC 119 sets the speed of the CPU 111 low. The EC/KBC 119 also has a function of switching the high/low speed of the CPU 111.

Figure 9:
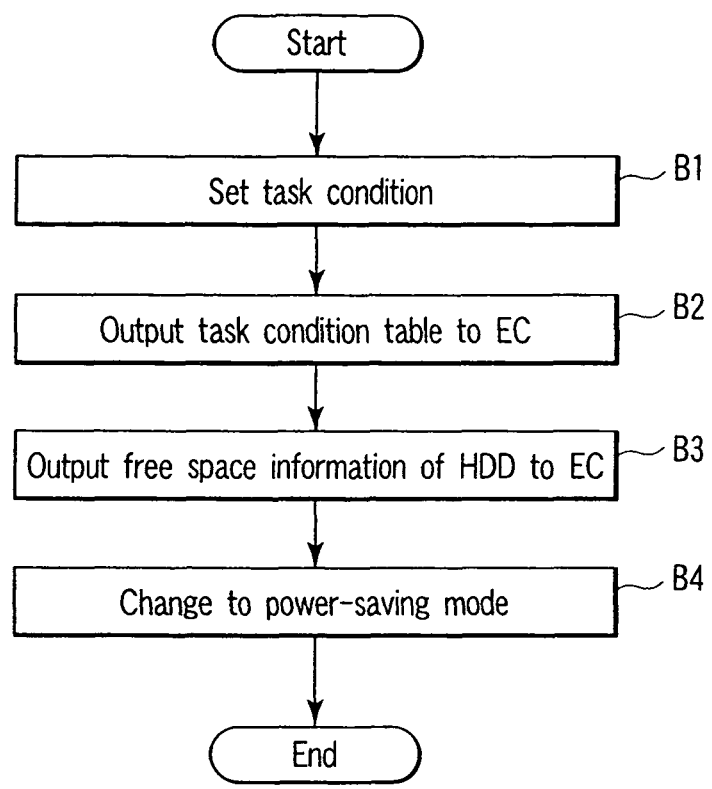
FIG. 9 is an exemplary flowchart showing an operation sequence when setting an AutoSync function in accordance with the AutoSync utility program in the information processing apparatus according to the embodiment.

FIG. 9 is an exemplary flowchart showing an operation sequence when setting the AutoSync function in accordance with the AutoSync utility program 101.

Upon displaying the setting window as the user interface to set the task condition (block B1), the AutoSync utility program 101 generates a task condition table containing the setting contents, and outputs the generated task condition table to the EC/KBC 119 (block B2). The AutoSync utility program 101 acquires the free space information of the HDD from the operating system 100, and outputs the acquired value to the EC/KBC 119 (block B3).

The AutoSync utility program 101 then requests the operating system 100 to change the computer 6 to the power saving mode (block B4).

Figure 10:
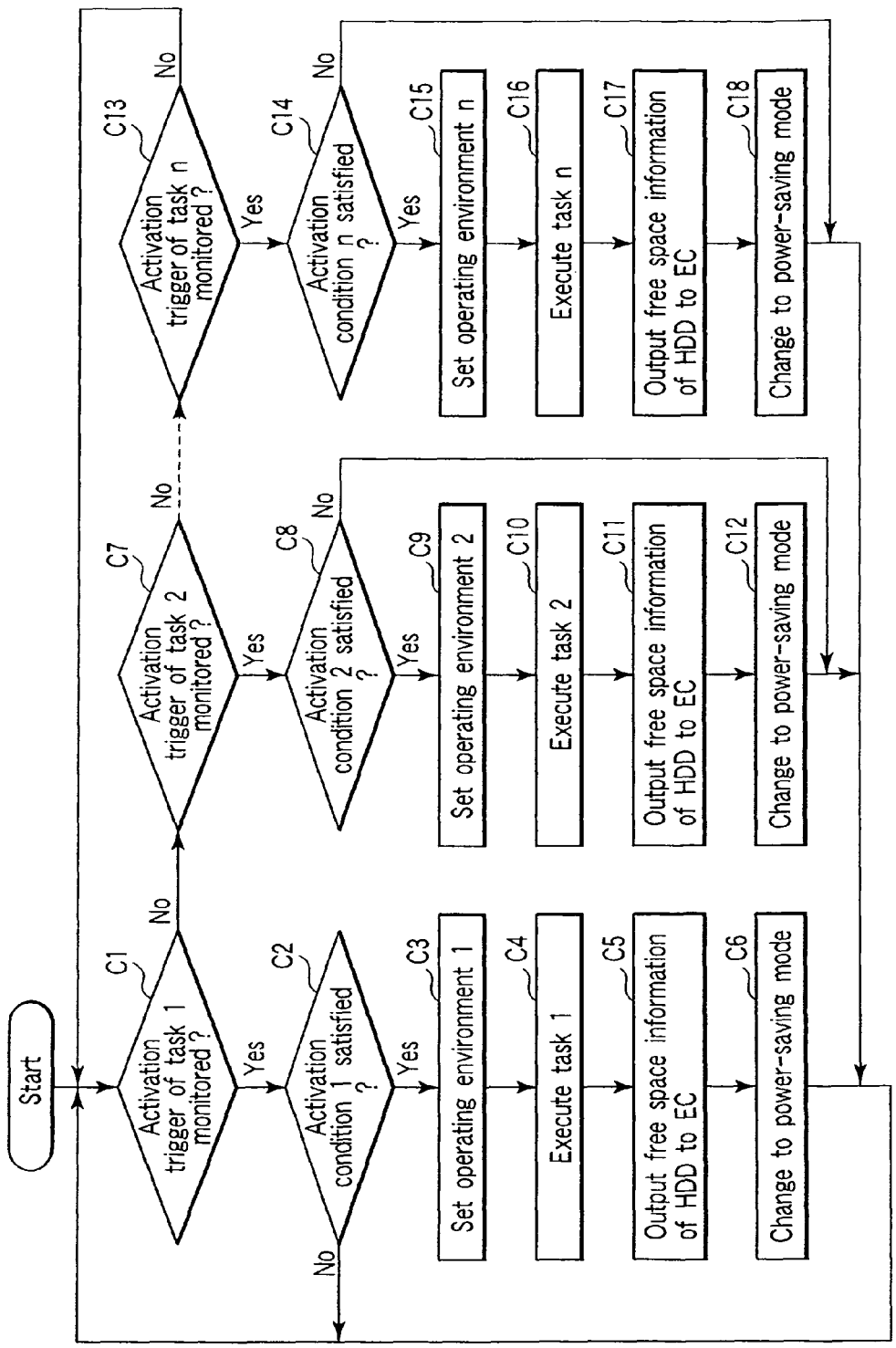
FIG. 10 is an exemplary flowchart showing the operation sequence associated with AutoSync processing in the information processing apparatus according to the embodiment.

FIG. 10 is an exemplary flowchart showing the operation sequence associated with AutoSync processing in the computer 6.

The EC/KBC 119 checks whether task 1 needs to be executed at this timing (block C1). If it is determined that task 1 needs to be executed at this timing (YES in block C1), the EC/KBC 119 checks whether the computer 6 satisfies the conditions (e.g., the remaining battery capacity and the free space of the HDD) corresponding to this task (block C2). If the computer 6 satisfies the condition corresponding to task 1 (YES in block C2), the EC/KBC 119 then sets the operating environment (e.g., the ON/OFF states of the DVDD 117 and the like, and high/low speed of the CPU 111) corresponding to this task (block C3).

Upon setting the operating environment corresponding to task 1, the EC/KBC 119 resumes the computer 6 from the power saving mode to execute task 1 (block C4). When task 1 is complete, the AutoSync utility program 101 acquires, from the operating system. 100, the free space information of the HDD at this timing to output the acquired value to the EC/KBC 119 (block C5). The AutoSync utility program 101 then requests the operating system 100 to change the computer 6 to the power saving mode (block C6).

When the computer 6 does not satisfy the condition corresponding to task 1 (NO in block C2), the EC/KBC 119 skips the above described processes in steps C3 to C6 to maintain the computer 6 in the power saving mode.

When task 1 need not be executed at this timing (NO in block C1), the EC/KBC 119 subsequently checks whether task 2 needs to be executed at this timing (block C7). If task 2 needs to be executed at this timing (YES in block C7), the EC/KBC 119 executes the processes in steps C8 to C12 for task 2 in correspondence with the steps C2 to C6 for task 1.

Likewise, the EC/KBC 119 checks whether task n needs to be executed at this timing (block C13). After that, the flow returns to block C1 for the first task 1, and the above processes are repeated.

As described above, it is appropriately determined whether the computer 6 needs to resume from the power saving mode for each task under each condition. The operating environment of the computer 6 is also appropriately set for each task.

With these operations, resume processing from the power saving mode for a task can be prevented when the task cannot be executed, or when it is apparent or likely that the task will end with an error. Additionally, waste of precious battery power by turning on a device unnecessary for the task can be prevented.

In the above embodiment, the two AutoSync buttons 16 and 17 are arranged on the upper surface of the computer body 11, and the "mail transmission/reception" and "folder synchronization" tasks are assigned to the respective buttons. However, one AutoSync button may be used in place of these AutoSync buttons. Upon depression of this AutoSync button, all tasks turned on in the setting window in accordance with the AutoSync utility program 101 may be sequentially executed as a task set.

Figure 11:
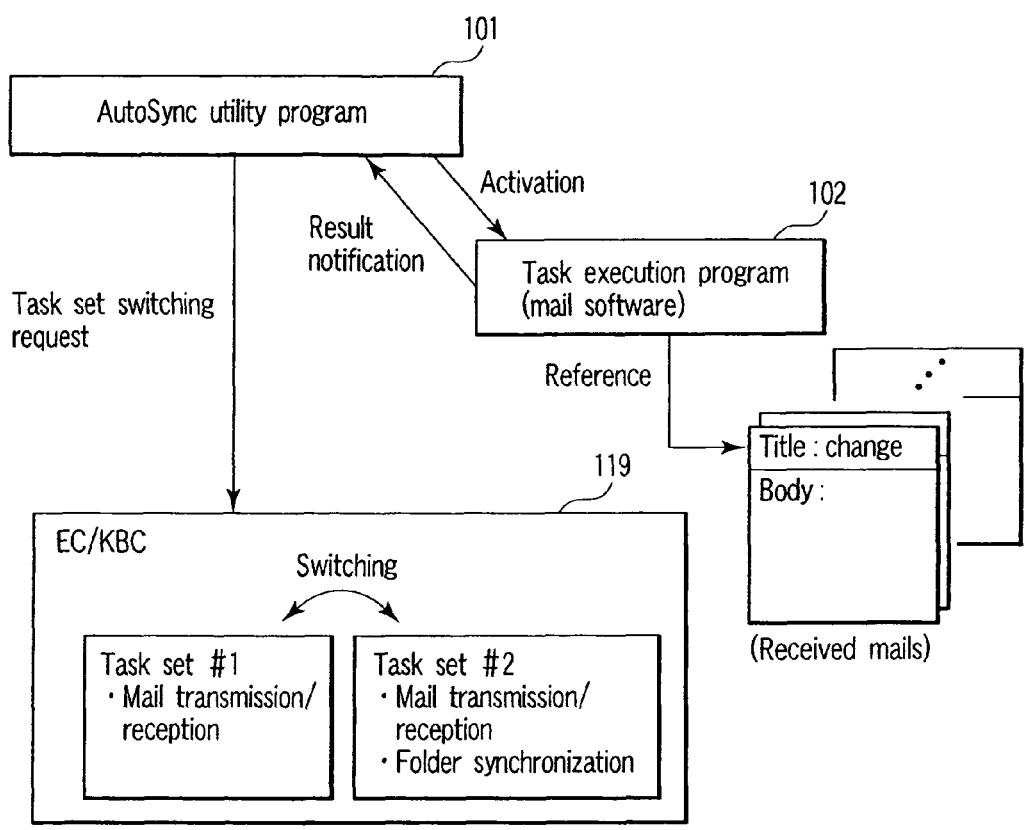
FIG. 11 is an exemplary view for explaining a modification associated with AutoSync processing in the information processing apparatus according to the embodiment.

The concept of "task set" is adopted to control the computer as shown in FIG. 11.

Assume that task set 1 includes only the "mail transmission/reception" task, and task set 2 includes the "mail transmission/reception" and "folder synchronization" tasks. Upon depression of the AutoSync button, or upon measuring a predetermined date/time by a timer, the EC/KBC 119 executes one of task sets 1 and 2.

Each of task sets 1 and 2 includes the "mail transmission/reception" task. The task execution program 102 to be activated for the "mail transmission/reception" task additionally includes a module for checking whether received mail messages contain a mail message whose title includes a predetermined keyword such as "change". If the mail message whose title includes a predetermined keyword is present, the AutoSync utility program 101 receives a message representing that.

On the other hand, upon reception of this message, the AutoSync utility program 101 outputs data to the EC/KBC 119 to switch the task sets. Hence, if a user wants to switch the task sets corresponding to the AutoSync function when the user is outing or on the move while leaving the computer 6 in an office, he or she transmits a mail message whose title includes a predetermined keyword such as "change" by using a cellular phone or the like. Only with this operation, the task sets can be switched by activating the next AutoSync process.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
a setting unit configured to set a condition for executing a predetermined task;
a button used to provide an instruction to execute the predetermined task; and
a control unit configured to:
execute the predetermined task upon resuming the information processing apparatus from a power saving state if the control unit determines that the state of the information processing apparatus satisfies the condition when the information processing apparatus is in the power saving state and when the button is operated, and
maintain the information processing apparatus in the power saving state if the control unit determines that the state of the information processing apparatus does not satisfy the condition when the information processing apparatus is in the power saving state and when the button is operated, wherein the information processing apparatus further comprises an acceleration sensor and the condition includes that an acceleration of the information processing apparatus measured by the acceleration sensor is not more than a predetermined value.

2. The information processing apparatus according to claim 1, further comprising a communication device, and
wherein the predetermined task includes a data communication process with an external apparatus by using the communication device.

3. The information processing apparatus according to claim 2, wherein the data communication process includes a step of receiving email from the external apparatus.

4. The information processing apparatus according to claim 2, wherein the data communication process includes a step of downloading data from the external apparatus.

5. The information processing apparatus according to claim 2, wherein the communication device comprises a wireless communication device for executing wireless communication, and the condition includes that the wireless communication device can wirelessly communicate with a base station.

6. The information processing apparatus according to claim 1, further comprising a battery, and
wherein the condition includes that a remaining capacity of the battery is not less than a predetermined value.

7. The information processing apparatus according to claim 1, further comprising a storage device, and
wherein the condition includes that a free space of the storage device is not less than a predetermined value.

8. The information processing apparatus according to claim 1, further comprising a temperature sensor, and
wherein the condition includes that a temperature measured by the temperature sensor is not more than a predetermined value.

9. An operation control method for an information processing apparatus comprising a button used to provide an instruction to execute a predetermined task, the operation control method comprising:
setting a condition for executing the predetermined task;
executing the predetermined task upon resuming the information processing apparatus from a power saving state if it is determined that the state of the information processing apparatus satisfies the condition when the information processing apparatus is in the power saving state and when the button is operated; and
maintaining the information processing apparatus in the power saving state if it is determined that the state of the information processing apparatus does not satisfy the condition when the information processing apparatus is in the power saving state and when the button is operated,
wherein the condition includes that an acceleration of the information processing apparatus measured by an acceleration sensor is not more than a predetermined value.

* * * * *